Feb. 14, 1967     L. R. LEACH     3,303,597
FISHING LURE
Filed Nov. 18, 1964

INVENTOR.
LAWRENCE R. LEACH
BY
*Lakwood, Woodard, Smith & Weikart*
*Attorneys*

United States Patent Office 3,303,597
Patented Feb. 14, 1967

3,303,597
FISHING LURE
Lawrence R. Leach, 820 S. Grant St.,
Muncie, Ind. 47302
Filed Nov. 18, 1964, Ser. No. 412,202
3 Claims. (Cl. 43—42.35)

The present invention relates to a fishing lure.

It is particularly desirable when designing and constructing an artificial fishing lure that the lure have an appearance similar to natural bait such as, for example, a minnow. When a minnow swims through the water it normally maintains an upright position. Consequently, any artificial minnow should also maintain an upright position as it moves through the water or else the lure will not be effective and fish will not strike the lure. It is, therefore, one object of the present invention to provide a fishing lure which more nearly approaches the appearance of a minnow than do existing fishing lures.

It is a further object of the present invention to provide a fishing lure which maintains an upright position as the lure moves through the water.

Still a further object of the present invention is to provide a fishing lure which moves through the water in a manner similar to a minnow.

Another object of the invention is to provide a fishing lure which is highly effective in catching fish.

Still another object of the present invention is to provide a fishing lure which does not spin as it moves through the water.

Related objectives and advantages will become apparent as the description proceeds.

One specific embodiment of the present invention might include an artificial fish lure comprising a hollow elongated body having a forward and rearward end and having approximately the same width as height, a tail on the rearward end of said body and including a rearwardly and upwardly extending fin and a rearwardly and downwardly extending fin, said tail having a width which is the same as said body at the proximal ends of said fins and which curves smoothly in a convex fashion to the distal ends of said fins, said downwardly extending fin being hollow toward the proximal portion thereof and solid toward the distal portion thereof to weight the distal portion of the downwardly extending fin whereby the downwardly extending fin tends to maintain the body in an upright condition while in water, said lure having a weight to volume ratio slightly lower than that of water whereby said lure barely floats in water, a lip on the lower forward portion of said body, said lip extending forwardly and downwardly and being entirely solid so as to weight the forward portion of said lure, said lip being flat so as to act as a deflector when the lure is pulled through the water causing the lure to move downwardly beneath the surface of the water, a pair of fins, one secured to the top and one secured to the bottom of said body for giving the lure the appearance of greater height than width so as to have the appearance of a minnow, a pair of fish hooks, one pivoted to the lower portion of said body and the other to the distal end of the rearwardly and downwardly extending fin.

The full nature of the invention will be understood from the accompanying drawings and the following description and claims.

Figure 1:
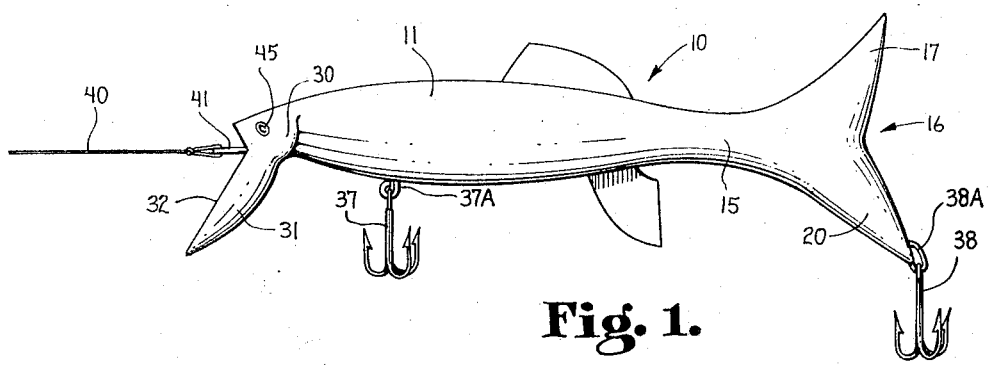
FIG. 1 is a side elevation of a fishing lure embodying the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
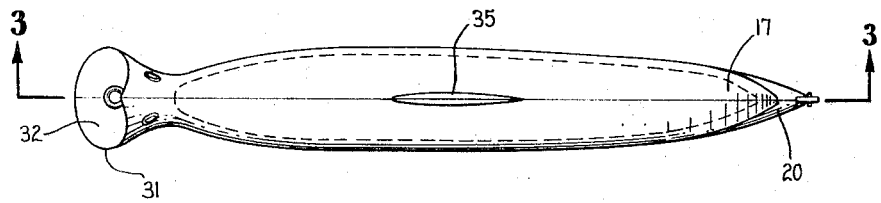
FIG. 2 is a top view of the structure illustrated in FIG. 1.
Figure 3:
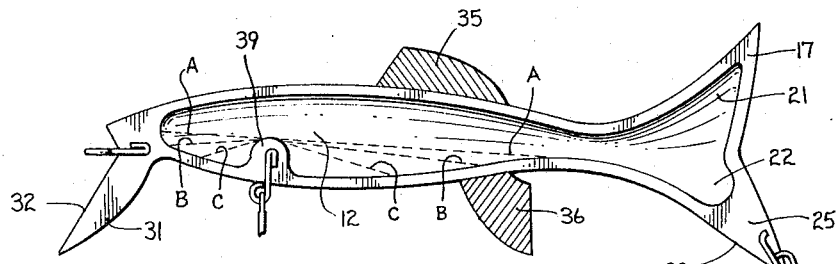
FIG. 3 is a vertical section taken along the line 3—3 of FIG. 2 in the direction of the arrows.
Figure 4:
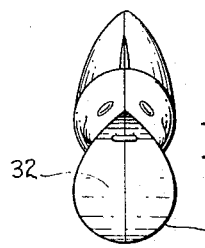
FIG. 4 is a front elevation of the structure of FIGS. 1–3.

Referring now more particularly to the drawings, there is illustrated a fishing lure 10 including a body 11 having a hollow interior 12. As can be seen in FIG. 2, the width of the body 11 along substantially the complete length of the body is equal to the maximum height of the body, said maximum height occurring at a point ahead of the central portion of the body. Thus, the width of the body at the rearward portion 15 thereof is substantially greater than the height of the body at said rearward portion. Because of the above described configuration of the body and other features described below, the fishing lure tends to maintain a horizontal or upright position rather than rolling over on its side.

Formed at the rearward end portion 15 of the body and merging smoothly therewith is a tail 16 which includes a rearwardly and upwardly extending fin 17 and a rearwardly and downwardly extending fin 20. It can be appreciated from an inspection of FIG. 1 that the lure with its tail 16 thus has an appearance very much like that of a minnow even though the body of the lure at certain portions thereof has a width greater than the height of the lure. The upwardly extending fin 17 is hollow as indicated at 21 while the downwardly extending fin 20 is hollow toward the proximal portion 22 thereof but solid toward the distal portion 25 thereof. This arrangement weights the distal portion of the fin 20 downwardly to provide additional means maintaining the body in an upright condition while in the water.

At the forward end portion 30 of the lure there is formed a lip 31 which has a flat forward surface 32 extending forwardly and downwardly from the body. The lip 31 is entirely solid so as to weight the forward portion of the lure. The lure has a weight to volume ratio slightly less than that of water whereby the lure barely floats in water. This last mentioned feature is particularly advantageous when the lure becomes hooked to seaweed or the like beneath the water and it is desired to disengage the lure. This can be accomplished by repeated pulls or jerks on the line connected to the lure to detach it and by then allowing it to float up from the object to which it was hooked.

Elongated flat fins 35 and 36 are secured to the top and the bottom respectively of the body 11 and function to give the lure the appearance of a minnow. The fishing line 40 is secured to the lure by means of an eyelet 41 threadedly secured to the forward end 30 of the body 11. The lure may be pulled through the water in such fashion as to cause the lure to have the same appearance as a swimming minnow. This is accomplished by pulling on the line 40 with a greater and then a lesser force at repeated intervals whereby the lure is caused to move downwardly and upwardly in the water as it moves forwardly. The lip 31 on the forward end of the body 11 acts as a deflector as the lure moves forwardly so that a greater pull on the line causes the deflector to move the lure more deeply in the water.

A pair of hooks 37 and 38 are mounted on the bottom of the body 11 and on the distal end 25 of the tail, respectively, by suitable eyelets 37A and 38A. The hooks function for their obvious purpose but also act to weight the lure to maintain it in an upright position. One advantage of the present lure is the fact that smaller hooks can be used than in conventional lures because of the herein described distribution of weight as provided by the hollow interior 12 and the solid lip 31 and the solid distal portion 25 of the fin 20. There is a further weighted portion which contributes to this weight distribution, this further weighted portion being the socket portion 39 for the hook 37, that is, the portion 39 around the eyelet 37A and at the lower forward portion of the body. Depending upon the size of the lure, a greater or lesser amount of solid portion 39 is provided. For a relatively large lure the solid portion will terminate along the dotted line A—A, for a large intermediate sized lure along the dotted line B—B, for a small intermediate sized lure along the dotted line C—C, and for a small lure along the solid line as shown.

The lure is provided with suitable paint covering or other decorative covering. Eyes 45 are painted or otherwise placed upon the forward end 30 of the body. This feature simulates the actual appearance of a minnow. The hollow interior of the lure can be formed by making the lure in two parts as defined along the line 3—3 of FIG. 2. The two parts are then hollowed out prior to securing them together to form the final lure. Alternatively, the hollow interior of the lure can be accomplished by injection molding procedures. Any of a number of various types of plastic have been found to be appropriate for constructing the present lure. It should also be mentioned that the lure of the present invention can be made from a material which is lighter than water (such as wood) assuming that weights are properly located in the lure.

It will be evident from the above description that the lure of the present invention definitely looks like a minnow. It will also be evident that the present lure remains upright as it moves through the water and does not spin and that it simulates a swimming action when pulled through the water with an increasing and decreasing force.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. An artificial fish lure comprising an elongated body having a forward and rearward end and having approximately the same width as height, a tail on the rearward end of said body and including a rearwardly and upwardly extending fin and a rearwardly and downwardly extending fin, said tail having a width which is the same as said body at the proximal ends of said fins and which curves smoothly in a convex fashion to the distal ends of said fins, said upwardly extending fin having a lesser weight to volume ratio than the entire lure, said downwardly extending fin having a greater weight to volume ratio toward the distal portion thereof than toward the proximal portion thereof to weight the distal portion of the downwardly extending fin whereby the downwardly extending fin tends to maintain the body in an upright condition while at rest in water, said lure having a weight to volume ratio slightly lower than that of water whereby said lure barely floats in water, a lip on the lower forward portion of said body, said lip extending forwardly and downwardly and having a greater weight to volume ratio than the entire lure so as to weight the forward portion of said lure, said lip being flat so as to act as a deflector when the lure is pulled through the water causing the lure to move downwardly beneath the surface of the water and beneath said rest position, a pair of fins, one secured to the top and one secured to the bottom of said body, a pair of fish hooks, one pivoted to the lower portion of said body and the other to the distal end of the rearwardly and downwardly extending fin.

2. An artificial fish lure comprising an elongated body having a forward and rearward end and having approximately the same width as height, a tail on the rearward end of said body and including a rearwardly and upwardly extending fin and a rearwardly and downwardly extending fin, said upwardly extending fin having a lesser weight to volume ratio than the entire lure, said downwardly extending fin having a greater weight to volume ratio toward the distal portion thereof than toward the proximal portion thereof to weight the distal portion of the downwardly extending fin whereby the downwardly extending fin tends to maintain the body in an upright position while at rest in water, said lure having a weight to volume ratio slightly lower than that of water whereby said lure barely floats in water, a lip on the lower forward portion of said body, said lip extending forwardly and downwardly and having a greater weight to volume ratio than the entire lure so as to weight the forward portion of said lure, said lip being flat so as to act as a deflector when the lure is pulled through the water causing the lure to move downwardly beneath the surface of the water and beneath said rest position, and a pair of fish hooks pivoted to said lure.

3. An artificial fish lure comprising an elongated body having a forward and rearward end, a tail on the rearward end of said body and including a rearwardly and upwardly extending fin and a rearwardly and downwardly extending fin, said upwardly extending fin having a lesser weight to volume ratio than the entire lure, said downwardly extending fin having a greater weight to volume ratio toward the distal portion thereof than toward the proximal portion thereof to weight the distal portion of the downwardly extending fin whereby the downwardly extending fin tends to maintain the body in an upright position while at rest in water, said lure having a weight to volume ratio slightly lower than that of water whereby said lure barely floats in water, a lip on the lower forward portion of said body, said lip extending forwardly and downwardly and having a greater weight to volume ratio than the entire lure so as to weight the forward portion of said lure, said lip being flat so as to act as a deflector when the lure is pulled through the water causing the lure to move downwardly beneath the surface of the water and beneath said rest position, and a pair of fish hooks pivoted to said lure.

References Cited by the Examiner

UNITED STATES PATENTS

| | | | |
|---|---|---|---|
| 1,951,626 | 3/1934 | Pashley | 43—42.35 X |
| 2,008,437 | 7/1935 | De Witt | 43—42.35 |
| 2,522,179 | 9/1950 | Jensen et al. | 43—42.35 X |
| 2,596,201 | 5/1952 | Bocchino | 43—42.35 X |
| 2,611,205 | 9/1952 | Steel | 43—42.35 X |
| 2,735,209 | 2/1956 | Faulkner | 43—42.35 |
| 2,933,846 | 4/1960 | Garner | 43—42.35 |

SAMUEL KOREN, Primary Examiner.

D. J. LEACH, Assistant Examiner.